United States Patent [19]

Martin

[11] Patent Number: 4,864,584
[45] Date of Patent: Sep. 5, 1989

[54] LASER DIODE PUMPED ND:YAG LASER AND METHOD OF MAKING SAME

[75] Inventor: Danny W. Martin, St. Charles, Mo.

[73] Assignee: Laser Diode Products, Inc., Earth City, Mo.

[21] Appl. No.: 100,557

[22] Filed: Sep. 24, 1987

[51] Int. Cl.$^4$ .............................................. H01S 3/091
[52] U.S. Cl. ........................................ 372/75; 372/36; 372/69
[58] Field of Search ....................... 372/34, 36, 69, 75; 357/81

[56] References Cited

U.S. PATENT DOCUMENTS

| | | | |
|---|---|---|---|
| 3,624,545 | 11/1971 | Ross | 372/75 |
| 3,663,893 | 5/1972 | Ostermayer, Jr. | 372/75 |
| 4,550,333 | 10/1985 | Ridder et al. | 372/36 |

OTHER PUBLICATIONS

R. B. Allen et al., "Continuous Operation of a YAIG:Nd Laser by Injection Luminescent Pumping", Applied Phys. Letters; vol. 14, No. 6, 15 Mar. 1969; pp. 188–190.

*Primary Examiner*—William L. Sikes
*Assistant Examiner*—B. R. R. Holloway
*Attorney, Agent, or Firm*—Haverstock, Garrett & Roberts

[57] ABSTRACT

A laser device having a support structure of unitary form including having connected first and second portions, the first of which extends outwardly from the connection portion to a free end which is defined by a groove and spaced surfaces on opposite sides thereof. A crystal gain medium is positioned in the groove and diode laser pump sources are located on opposite sides of the groove on the spaced surfaces and are constructed of heat sink members attached to the surfaces and a plurality of laser diodes mounted on selected ones of the heat sinks in positions to optically couple the laser diode outputs to the crystal gain medium rod. The laser diodes are formed by sheet segments constructed of materials having first and second semi-conductor characteristics forming a junction therebetween including a plurality of closely spaced elongated stripes, whereby when an electric potential of sufficient voltage is applied across the junctions the area under the stripes will take on a lasing condition the outputs of which will be coupled to the crystal gain medium to produce a lasing condition therein. The support structure also has means for mounting an output mirror and the invention further resides in the novel construction of a mask which can be segmented for constructing a plurality of diode laser segments.

17 Claims, 4 Drawing Sheets

Prior Art

Prior Art

LASER DIODE PUMPED ND:YAG LASER AND METHOD OF MAKING SAME

SUMMARY OF THE INVENTION

The present laser diode pumped laser employs semiconductor laser diodes as a means for exciting the gain medium which may be a Nd:YAG crystal or rod. The subject laser device is relatively small and compact, totally solid state, highly efficient, and is ideal for optical output levels ranging from a few nanowatts to several watts of continuous power. The manner in which the pump source means are assembled, cooled and fabricated involves a unique laser construction with a unique heat sink means and associated thermal path. The geometry of the resonator employed in the subject laser and the manner in which the output of the pump sources and the Nd:YAG crystal are mounted on the resonator base plate and coupled to one another is also new. In the present construction the novel resonator is of one piece construction having a pedestal portion on which the pump sources and the Nd:YAG rod are mounted, and a spaced second integral portion on which the output mirror for the laser is mounted. The unitary construction of the resonator produces a very stable and rugged mechanical structure for the laser and enables the device to be made relatively small and compact yet highly efficient. The construction of the mask used in the construction of the laser diode pump sources is also new and is an important advance in the construction of diode pumped laser devices.

The subject diode pumped Nd:YAG laser, because of its novel construction, including its relatively high diode packing density and novel heat sinking, can be operated in a continuous mode as contrasted to most existing diode pumped lasers which operate in a pulsed mode or in a quasi-pulsed mode which simulates a continuous mode. Such a known construction is disclosed in U.S. Pat. No. 4,575,854 for which applicant is the named inventor. Some known diode pumped lasers employ relatively elaborate and complicated cooling means which enable them to operate in a continuous mode but this is not generally the case. The present laser construction by contrast employs heat sink means with associated diode packing densities for the pump sources that are relatively much more efficient than available from known devices, and because of this the present construction has good operating characteristics and good heat dissipation characteristics and can operate with minimal heating. This allows for higher optical outputs for a laser having an overall smaller resonator package.

It is a principal object of the present invention to teach a novel construction and operation for a laser device using laser diodes as the pump sources for exciting a gain medium such as a Nd:YAG rod.

Another object is to teach the construction of a laser device having a diode pumped Nd:YAG crystal, which device employs a novel one piece resonator construction for stability, small size, compactness, ruggedness and to minimize the effects produced thereon by environmental changes.

Another object is to teach the construction of improved heat sink means for cooling the laser diodes used as a pump source for a laser rod.

Another object is to provide improved mounting means for a laser crystal and for a pump source coupled thereto.

Another object is to provide improved and more direct means for extracting waste heat from a laser crystal pump source.

Another object is to provide a relatively rugged and compact diode pumped laser that is capable of operating in a continuous mode.

Another object is to teach the construction of a laser device capable of producing a relatively high optical output using a relatively small compact resonator package.

Another object is to teach the construction and operation of a semi-conductor laser using laser diodes as its pump source, which laser is relatively inexpensive to make yet highly reliable, and incorporates heat extraction means which enable it to operate in a continuous mode.

Another object is to construct a laser diode pump source that has a very high packing density of laser diodes.

Another object is to teach the constructions of a novel laser diode mask device from which laser diodes used as a pump source can be taken.

Another object is to construct a diode pumped laser with a mirror and mirror mounting which allows for better control of the mode of the laser beam and of the beam divergence.

Another object is to provide a laser construction that has very stable thermal and opto-mechanical properties.

Another object is to produce improved and highly efficient coupling between diode pump sources and a laser gain medium.

These and other objects and advantages of the present invention will become apparent after considering the following detailed specification covering several embodiments of the invention in conjunction with the accompanying drawings, wherein:

DETAILED DESCRIPTION OF PREFERRED EMBODIMENT

Figure 1:
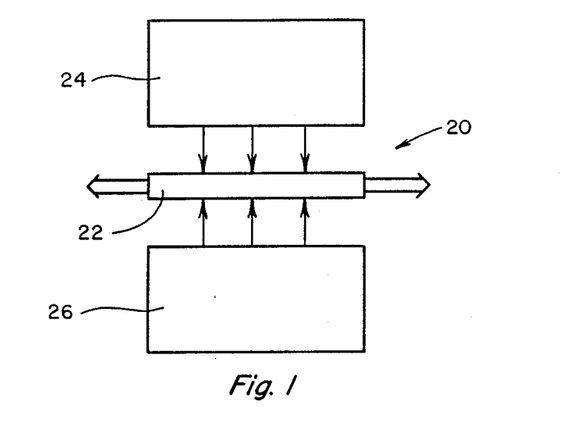
FIG. 1 is a block diagram of a laser device embodying the principals of the present construction.

Referring to the drawings more particularly by reference numbers, number 20 refers to a laser device constructed according to the teachings of the present invention. The laser 20 includes a gain medium shown as Nd:YAG crystal or rod 22 which is mounted, as will be more fully explained, to be coupled to receive energy or to be stimulated to lase by the outputs it receives from a plurality of spaced and opposed laser diode pump sources 24 and 26. The construction of the pump sources is important to the invention and will be described in detail hereinafter. In FIG. 1 the laser energy outputs from the laser diode pump sources 24 and 26 are illustrated by arrows directed at and coupling to the crystal rod 22. These outputs cumulatively operate to stimulate the rod 22 and to produce a lasing condition therein. Other arrows in FIG. 1 extend axially from opposite ends of the rod 22 and represent the main laser output. A typical output for the subject laser is a coherent light beam having a frequency whose wavelength is 1.064 micrometers, with the outputs of the laser diodes 24 and 26 used to excite the gain medium or laser rod typically operating at a frequency whose wavelength is 8.06 nanometers. Such laser constructions are ideal for producing optical output levels ranging from a few nano watts to several watts of continuous power.

The novelty of the present laser resides in several things including the construction of the pump sources, how the pump sources are assembled, cooled and fabricated, in the geometry of the laser resonator which is constructed as a one piece integral member, in the manner in which waste heat is extracted from the pump sources, and in the stability and size of the subject device which allows for a very compact rugged construction capable of producing a stable operating condition. These factors contribute to a very efficient laser device and one which is able to operate in a continuous mode output. The fact that the present laser is able to be operated in a continuous mode is in contrast to most existing diode pumped Nd:YAG lasers which, for the most part operate in a pulsed mode or in a quasi-pulsed mode that simulates but is not the same as a continuous mode. This in large part is due to relatively low packing densities for the diode laser sources and inefficient heat sinking in the prior art constructions as compared to the present construction. As indicated, such a known laser device is disclosed in U.S. Pat. No. 4,575,854 for which applicant is the named inventor.

There are other laser devices that use elaborate cooling systems and methods to enable them to operate in a continuous mode. This is not the case with the present construction which achieves good heat sinking by providing relatively high packing densities for the pump sources so that the sources can operate efficiently and still with good heat dissipating characteristics. This also allows the present laser device to operate at higher optical outputs than known devices and with a smaller resonator construction and a smaller overall laser size for a given output.

Figure 2:
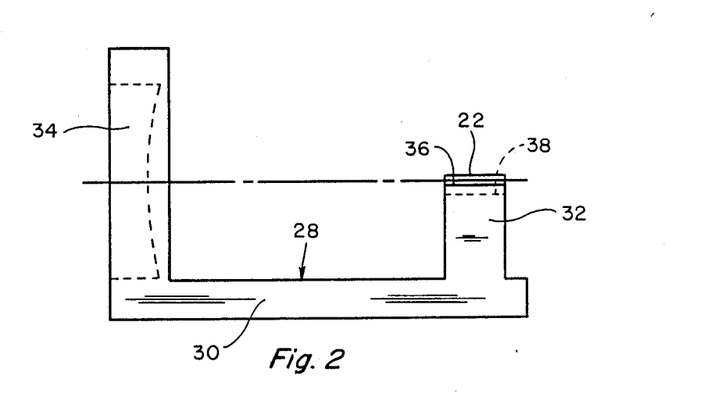
FIG. 2 is a side elevational view of the subject laser device.

FIG. 2 shows the construction of a resonator 28 for use with the subject device, which resonator is relatively small and includes a base portion 30 which has formed therewith an integral pedestal portion 32 and an integral output mirror mounting support portion 34 spaced from the pedestal 32. The resonator 28 is constructed of a conductive material such as copper or aluminum. The pedestal 32 has an upper surface 36 which is accurately machined to the shape shown including having a groove 38 in which the Nd:YAG gain medium or rod 22 is mounted, and spaced surfaces 40 and 42 on which the pump sources 24 and 26 are mounted. The fact that the pedestal 32 and mirror mount 34 are parts of the same member adds significantly to the mechanical stability and ruggedness of the resonator 28, and means that no joints or dissimilar types of material are, or need be used, in the resonator 28 which could cause the different parts to expand or contract at different rates due to environmental changes such as changes in temperature to adversely effect the alignment of the device. This is important. Furthermore, the fact that the resonator or mounting means 28 for the rod 22, the pump sources 24 and 26, and for output mirror 44 are all integral parts on the same member facilitates and simplifies the construction of the device and means that separate parts or members of the resonator do not need to be assembled and/or connected together. Furthermore what machining is required is all performed on the same member 28 further reducing the cost of manufacture.

Figure 5:
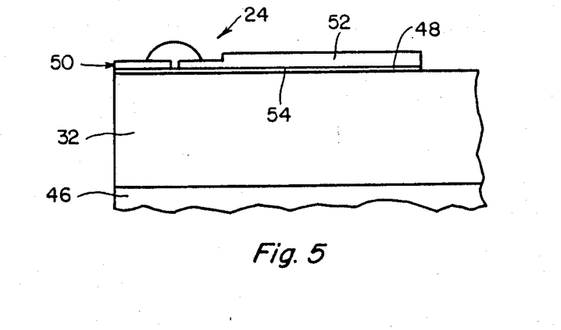
FIG. 5 is a fragmentary side elevational view of one of the pump sources employed in the subject laser device.

The heat sinking means included in the present device to carry away and dissipate waste heat from the subject device is unique, highly efficient and important to the operating characteristics. With the present construction active cooling is also obtained using a thermoelectric cooler 46 attached to the bottom or underside (side opposite the pedestal and support portion 32 and 34) of the resonator 28 as shown in FIG. 5. The cooler means 46 also allows for temperature tuning of the wavelength of the laser diode pump sources 24 and 26 to some desired frequency such as to 806 nanometers which is the optimum wavelength for pumping Nd:YAG crystals. In addition to providing temperature tuning, waste heat is extracted from the laser diodes 24 and 26 by the cooler 46 and prevents the diodes from heating up or overheating and shifting or changing wavelength which, if this should occur, would have the adverse effect of causing less of the output energy of the pump sources to be available to be used to stimulate the rod 22, thereby reducing the output of the laser.

Figure 4:
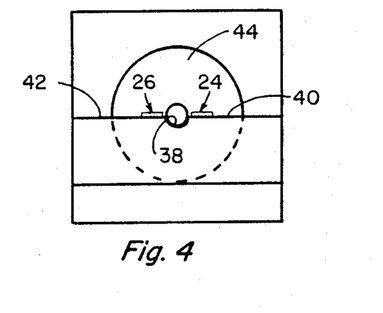
FIG. 4 is right end view of the device of FIG. 2.

In the past, some diode pumped Nd:YAG lasers have provided coatings on the ends of the Nd:YAG crystal member or rod 22, and these coatings have been used as the mirrors for the device. Such constructions, however, do not allow for any control of beam divergence or of the optical mode and this is a significant disadvantage. The present construction, by contrast, uses an external mirror 44 (FIG. 4) mounted on the mirror support portion 34 (FIG. 2) of the resonator 28. This allows for control of the optical mode of the laser beam and also controls of the beam divergence. The mirror mounting 34, like the surfaces 40 and 42, is an accurately machined surface on the one piece resonator 28. The integral resonator construction contributes to the thermal and mechanical stability of the device and produces the indicated advantages.

It is significant that all of the operating components of the present laser, namely, the pump sources, the YAG rod and the output mirror are in accurate alignment for the best operation, and it is from these components and especially from the pump sources that heat must be dissipated during operation if the device is to operate properly and efficiently. All of these elements or components are continuously and simultaneously cooled by the thermoelectric cooler means 46. This is not true of other known and conventional diode pumped lasers wherein the heating of the different elements and components causes unequal expansion of the components which results in some misalignment and reduced efficiency. Also, the known prior art diode pumped lasers, for the most part, are physically larger than the present laser and with the larger known devices it is generally impractical to provide adequate and uniform cooling for all of the various components simultaneously and by the same heat sink means. By making all of the critical support components for the subject laser from the same member, expansion (and contraction) takes place uniformly and at the same rate throughout when temperature changes occur, and this produces an important and significant advantage for the present construction over known constructions.

Each of the pump sources 24 and 26 (FIGS. 1 and 10) is constructed of a plurality of adjacent heat sink members 48 arranged in rows on the surfaces 40 and 42. In an actual device each heat sink member is constructed to be 2.5 to 1.5 millimeters wide, 5.0 millimeters long and 0.008 inch thick and is constructed of solid copper. Each sink member 48 (FIGS. 3 and 9) has a diode mini-bar 50 mounted on it and the diode mini-bars are constructed of a plurality of closely spaced laser diodes 51. Typically, between 30 and 44 such laser diodes 51 are included in each mini-bar 50. This provides a good efficient packing density and one in which the lasing energy from adjacent laser diodes reinforces each other somewhat thereby increasing the total output energy coupled to the YAG rod 22. The heat sink members 48 of the size indicated have been found to be an ideal size taking into account the size and construction of the diode mini-bars employed, the uniformity of the diode material, and the overall size of the subject laser device. If wider heat sink members and larger diode mini-bars were used, a lower yield would result with a corresponding reduction in output lasing. For example, if heat sink members as wide as 5 millimeters were used for the same number and length diode mini-bars, which typically are from about 1.2 to 1.5 millimeter long, the packing density would suffer severely as would the laser output. Consequently for maximum packing density and maximum yield for the diode material used, the use of heat sinks 2.5 to 1.5 millimeters wide, for diode laser mini-bars of the length and number indicated provides a very satisfactory and efficient operating condition. On the other hand if smaller narrower heat sinks were used it would make it awkward and difficult to mount the diode mini-bars, and the fabrication procedures required to produce them would be much more difficult. Furthermore, the increased packing density for such a construction would not allow for proper heat sinking and this also would adversely effect the operation. Thus the heat sink size described above for the diode mini-bars 50 required produces a very satisfactory operating condition with a relatively high packing density, capable of producing high yield. This construction is capable of producing a reliable continuous wave (CW) operation for the pump sources 24 and 26 coupled to the Nd:YAG crystal 22 and enables production of a much higher optical output for the subject laser than can be obtained from known laser diode pumped laser constructions.

Figure 3:
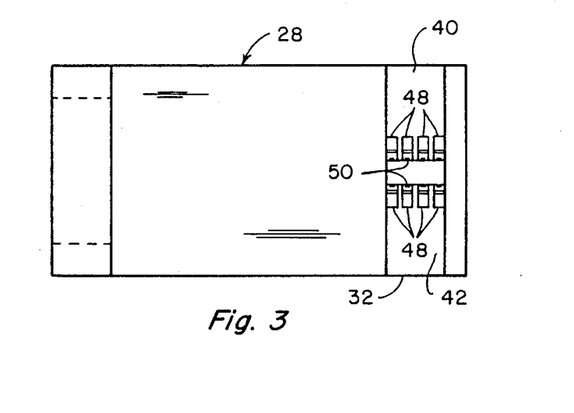
FIG. 3 is a top plan view of the device of FIG. 2.
Figure 6:
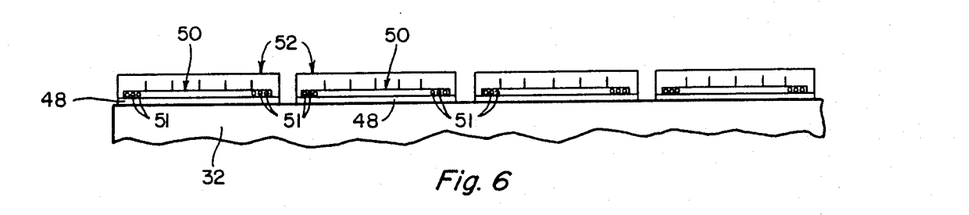
FIG. 6 is a greatly enlarged elevational view taken from the left of the pump source shown in FIG. 5.
Figure 7:
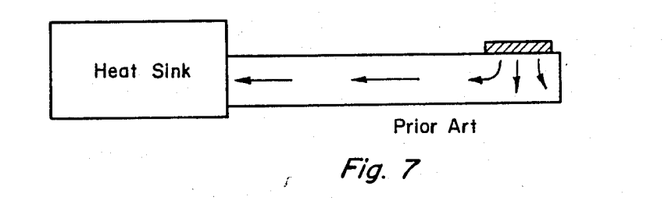
FIG. 7 is a side elevational view of a prior art laser diode construction and its associated heat sink.
Figure 8:
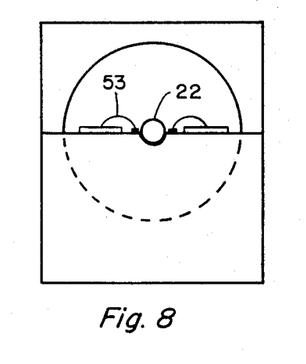
FIG. 8 is a further enlarged right end view similar to FIG. 4 but showing more of the details of the construction of the subject laser device.
Figure 9:
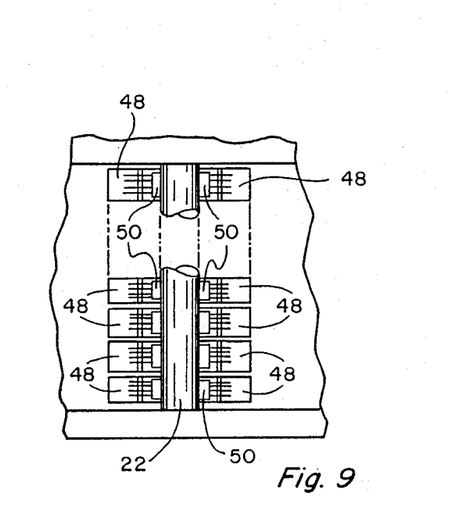
FIG. 9 is an enlarged fragmentary top plan view of a portion of the laser device shown in FIG. 8.

Each laser diode heat sink 48 has its associated laser diode mini-bar 50 located at or very near one end thereof which is the end that is closest to the laser rod 22 as shown in FIG. 5. A wirebond pad 52 is also mounted on each heat sink member 48 and each such pad has sufficient electrical connections to its associated mini-bar 50 to carry the current that is necessary to produce a lasing condition in them. One such wirebond pad 52 is required to be mounted on each heat sink member 48 in spaced relation to the laser diode mini-bar 50 as shown in FIGS. 5 and 6. An electrical insulating layer 54 is provided between each of the wirebond pads 52 and the associated laser diode heat sink 48 to prevent electrically shorting the pads 52 to the heat sinks 48. The insulating layers 54 are typically from between about 0.002 to 0.003 inch thick. Each laser diode mini-bar 50 must have its own heat sink 48 as stated, and this allows for individual testing of the mini-bars 50 prior to assembly of a plurality of heat sinks 48 into the completed pump sources 24 and 26. Once the desired number of heat sinks 48 with mini-bars and wire bond pads have been tested and approved, they are assembled into the completed pump sources 24 and 26 as shown in FIGS. 3 and 9.

Figure 10:
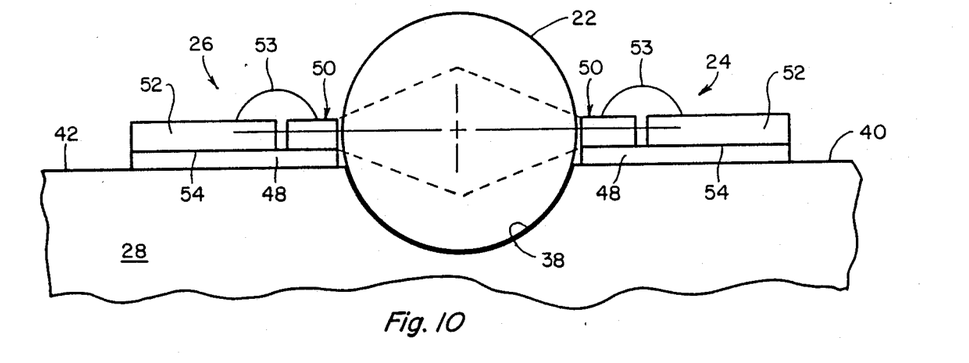
FIG. 10 is a still further enlarged fragmentary end view showing illustratively the location of the optical outputs of the laser diodes and their coupling relationship to the laser rod.

The YAG rod 22 and the pump sources 24 and 26 are mounted on the upper surface 36 of the pedestal portion 32 (FIG. 2), as stated, and with this construction it is possible during assembly to accurately align the pump sources 24 and 26 to the YAG rod 22 to maximize the coupling of the outputs of the diode laser mini-bars 50 to the YAG rod 22. Furthermore with the present construction it is possible to make the spacing between the pump sources 24 and 26 and the laser rod 22 as close as possible, even as close as about 0.001 to 0.002 inch thereby maximizing the coupling therebetween and minimizing loss of output from the diode laser mini-bars 38 due to beam divergence. This is illustrated in FIG. 10 wherein the laser diode pump sources 24 and 26 are shown oriented horizontally with respect to the horizontal YAG rod 22 and aligned with the axis of the rod 22. With this construction of the resonator base plate 28 as described it is possible to obtain very precise vertical positioning of the YAG rod 22 relative to the pump sources 24 and 26 and maximum coupling therebetween. Accurate orientation both vertically and horizontally of the pump sources with respect to the YAG rod 22 is essential for maximum coupling efficiency. This in large part is due to the fact that the YAG rod 22 is circular in cross-section and therefore any slight positional displacements of the diode lasers relative thereto will permit some of the output energy of the diode lasers to be at or beyond the acceptance angle where those portions of the outputs will be unavailable or reflected and not absorbed by the YAG rod 22. To the extent this occurs it will reduce the coupling efficiency. With the present construction as described, all, or substantially all, of the output energy of the laser diodes 51 is coupled into the YAG rod 22 and this condition is maintained even when temperature and other environmental changes occur.

The construction of the diode laser pump sources and particularly the diode mini-bars 50 is important to the present invention. Each diode laser pump source includes a plurality of opposite sides of the groove 38 in which the laser rod 22 is positioned. Each heat sink 48 has a plurality of laser diodes 51 which are formed into one of the mini-bars 50 mounted on it in position with corresponding ends of the diodes facing the laser rod 22 and closely spaced therefrom as explained.

Figure 15:
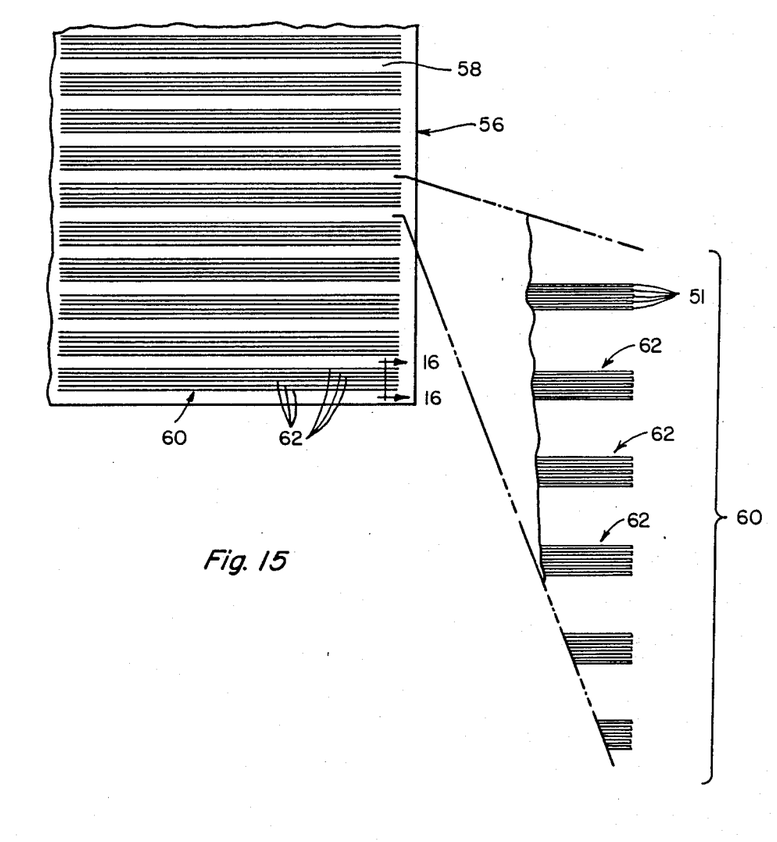
FIG. 15 is an enlarged perspective view of a diode laser mask from which the laser diodes that form the pump sources are taken.
Figure 16:
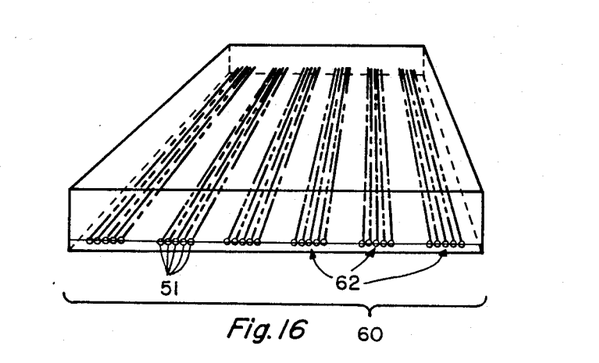
FIG. 16 is an enlarged perspective view of a laser mini bar constructed according to the present invention.

Referring to FIGS. 15 and 16 there is shown a laser diode wafer 56 on which are positioned a plurality of very closely spaced current confinement stripes which is the area where lasing occurs. These stripes are arranged in spaced groups 60 extending across the mask 56 in one direction. In the particular embodiment shown each group 60 has six (6) similar portions 62, each portion in turn being formed of a plurality of individual laser diodes 51 as shown in the enlarged portion of the diagram in FIG. 16. In other words, each line on the mask 56 in FIG. 15 is made up of five (5) spaced diode members 51 which extend substantially across the mask 56 in one direction. A typical mask can be approximately one square inch in size so it can readily be understood that the space between the adjacent individual diodes 51 is extremely small.

The mask 56, when used to construct laser mini-bars 50 is separated or cleaved into individual diode segments or mini-bars 50, a typical diode mini-bar being shown in FIG. 16 made up of the 30 individual diodes 51 which represents one group 60 of diodes. In constructing the mini-bars for the subject laser a small portion of one of the groups 60 will be cleaved off and attached as by soldering to one of the heat sinks 48. Each such cleaved piece of the mask 56 in the construction as shown will have diodes 51 that are approximately 250 micrometers in length. The diodes 51 are oriented on the heat sink so that one of their ends faces and is coupled optically when lasing to the laser rod 22.

After a section or mini-bar 50 is cleaved from the mask 56 the exposed sides of the diode facets 51 are optically coated to maximize performance. After optically coating the facets the mini bar is soldered to the heat sink 48 to form an electric connection therewith. The exposed side of each of the mini bars then has a plurality of electrical wires 53 connected to it, the opposite ends of the wires being connected to the respective wire bond pads 52. The pads 52 will also have electrical connections to one side of an energy source used to stimulate the diodes 51 to lase. In the embodiment shown a negative polarity is applied to the wire bond pad 52 and the positive side of the energy source is connected to the resonator base 28 which is normally connected to the laser diode heat sink 46. The close proximity of the individual diodes 51 to one another in the mini-bars 50 is an advantage in the present construction because it means that there will be some exchange or reinforcement of energy between the diodes. It is also to be noted that the adjacent sets of mini-bars 50, that is the sets on adjacent heat sink members 48, can be connected electrically in series with each other, while the 30 or so diodes in adjacent ones of the mini-bars 50 are connected in parallel across the energy source.

The stripe pattern of the diodes in each mini-bar 50 is helpful for dissipating heat therefrom. With this arrangement of diodes in the mini-bars and with the connections made thereto as described above, the energy required to cause each individual diode in the mini bar to lase is relatively small compared to an equal number of physically separate diode lasers. This is an advantage and one which enables the present device to operate with relatively less input energy than known devices. This can be explained in part because of the packing density of the diodes which produces an optimum operating condition.

The construction of the mask 56 is an important part of he present invention and provides a unique way of constructing, positioning and attaching the diode members 51 to the heat sink 48. The high packing density which is also important for the reasons stated enables the present lasers to be made physically relatively small and compact which is important for laser devices particularly in many applications thereof where the laser is to be used in relatively tight quarters and where the laser must be handled and manipulated. The number and spacing of the diodes 50 in the groups 60 can, however, be varied as desired without departing from the spirit and scope of the invention. For example, the groups 60 can have greater or lesser numbers of diodes in he grouping and to some extent the spacing between the diodes in the groups can be varied.

The present construction therefore employs unique and efficient means for extracting waste heat from laser diodes in a laser construction and it teaches a rugged, compact, relatively small, highly efficient laser device and one that achieves excellent diode packing densities and heat dissipation. The construction and attachment of the laser diodes that form the pump sources is also new as indicated.

Figure 11:
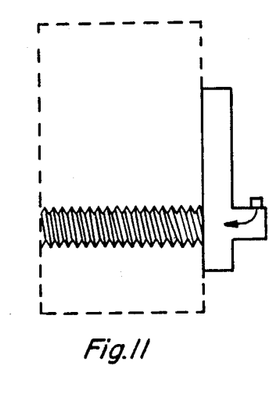
FIGS. 11, 12 and 13 show various prior art heat sink/cooler constructions employed in laser devices.
Figure 12:
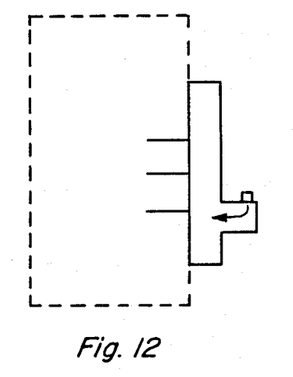
Figure 13:
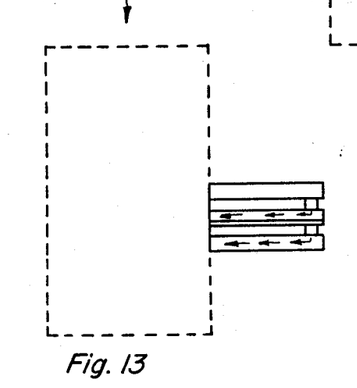
Figure 14:
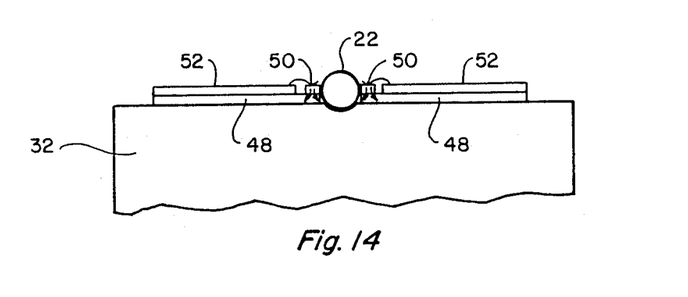
FIG. 14 is an enlarged cross-sectional view showing the construction of the heat sink/cooler means employed in the present laser construction.

For the most part, known laser diode heat sink constructions extract waste heat through means located at the back and by means whereby the heat being extracted moves at least in part in the plane of the diode surfaces. This elongates the heat dissipation path and is a disadvantage of such devices since the heat from the laser diodes 51 in the mini-bars 50 radiates outwardly in more or less of a 45° angle cone shape which means that the thermal paths are formed along the length instead of the width of the heat sinks and are therefore relatively long, usually much too long in known devices to minimize the thermal lag between the heat source (the laser diodes) and the heat extractor or radiator/cooler on which the resonator 28 is mounted. FIGS. 11, 12 and 13 show several different known laser diode heat sink constructions with their associated relatively long thermal paths indicated by arrows. The length of the thermal paths in the known constructions vary from a low of about 0.08 inch to lengths greater than about 0.5 inches. By contrast, with the present construction waste heat is extracted much more directly from the bottom of the heat sinks 48 in a direction perpendicular to the plane of the laser diodes. This is the shortest possible thermal path for heat dissipation and one which exerts the least possible thermal resistance. Also, heat is extracted from both directions away from the facets of the diode. This is illustrated in FIG. 14 where the laser diodes are shown mounted adjacent one end of the respective heat sink members 48 which in turn are mounted on the resonator pedestal 32 which is normally an integral part of the resonator base plate which is mounted on the heat sink/cooler. The waste heat therefore passes from the mini bar directly through the laser diode heat sink members 48 into the resonator base plate 28, which is a good heat conductor, and then into the heat sink/cooler 46 on the opposite side thereof. The length of the heat sink paths thus produced is no greater than about 0.008 inch before reaching the infinite heat sink area of the resonator base plate. This is a marked improvement over prior constructions and is a principal reason why the present construction can be operated cooler and therefore in a continuous mode as distinguished from the prior art constructions which can operate only in a pulsed or quasi-pulsed mode because of the overheating possibility.

Thus, there has been shown and described a novel and non-obvious laser device and associated heat dissipation means and mask means for producing laser diode mini-bars which fulfills all of the objects and advantages sought therefor. It will however, be apparent to those skilled in the art that many changes, modifications, variations and other uses and applications for the subject device are possible. All such changes, modifications, variations and other uses and applications which do not depart from the spirit and scope of the inventions are deemed to be contemplated and covered by the present invention which is limited only by the claims which follow.

I claim:

1. A laser device comprising a unitary support structure having spaced apart first and second support portions and a portion connected therebetween, the first portion extending outwardly from the connecting portion at substantially right angles thereto to a free end, a support surface formed on the free end of said first support portion, a rod member constructed of a material that is capable of being stimulated to produce a lasing condition therein mounted on the support surface, said rod member having an axis oriented to extend through the second support portion, a plurality of laser diodes mounted on the support surface adjacent to at least one side of the rod member, said laser diodes being arranged in groups on said one side of the rod member and the laser diodes in each of said groups being oriented such that when they are stimulated to lase their outputs are directed at the rod member to stimulate the rod member to cause the rod member to lase, and output mirror means mounted on the second support portion in position to be aligned with the output of the rod member.

2. The laser device defined in claim 1 wherein said plurality of said laser diodes includes opposed sets of laser diodes mounted on the support surface respectively on opposite sides of the rod member.

3. The laser device defined in claim 1 wherein said laser diodes are formed into groups for mounting on a heat sink member, a wire bond pad spaced from the laser diodes on the respective heat sinks, means electrically insulating the wire bond pads from the respective heat sinks, and means forming electrical connections between the laser diodes and the associated wire bond pads.

4. The laser device defined in claim 1 wherein the laser diodes when stimulated produce outputs which radiate outwardly therefrom in an angular pattern, said laser diodes being located between about 0.001 and about 0.002 inch from the rod member so that substantially all of their radiated output energy is directed the rod member.

5. The laser device defined in claim 1 wherein the laser diodes are arranged in rows on opposite sides of the rod member, each of said rows including a plurality of spaced heat sinks, each of the heat sinks in each row having a plurality of laser diodes mounted adjacent to corresponding ends thereof and adjacent to the rod member, and each of said heat sinks having a wire bond pad mounted thereon insulated therefrom and spaced from the respective laser diodes thereon, and means forming electrical connections between the laser diodes on each heat sink and the associated wire bond pads.

6. The laser device defined in claim 5 wherein the distance between the respective laser diodes and the laser rod is between approximately 0.001 and 0.010 inch.

7. The laser device defined in claim 1 wherein the rod member is a crystal gain medium.

8. The laser device defined in claim 1 wherein the support surface on the first portion of the support structure has a channel formed therein in which the rod member is positioned, the support surface on opposite sides of said channel being oriented such that the laser diodes mounted thereon are oriented in a plane which passes through the axis of the rod member.

9. The laser device defined in claim 5 including means forming an insulating layer between the wire bond pads and the respective heat sinks, and means for mounting the laser diodes and their respective heat sinks on the support surfaces and a heat sink/cooler for mounting the support structure into which waste heat produced during a lasing operation can pass and be dissipated.

10. The laser device defined in claim 9 wherein the device can be operated in a continuous mode.

11. The laser device defined in claim 9 wherein the thermal path for waste heat from the laser diodes to the support structure is approximately 0.008 inch.

12. A diode laser mini bar construction comprising a substrate heat sink member constructed of a GaAlAs, said substrate having opposed surfaces and a length not to exceed about 2.5 mm, a plurality of individual current confinement strips arranged in a plurality of spaced groupings on one of the opposed surfaces of the heat sink member and extending in parallel relationship, the groupings of current confinement stripes on said member being able to handle up to about 10 watts of heat load but not to exceed an input load per mini bar of about 10 watts per 1.5 mm width of the heat sink member, means forming a junction on said one opposed heat sink surface, said mini bar construction being capable when a lasing potential is applied across the junction of producing a lasing condition along each of the current confinement stripes, the heat generated along each of said stripes defusing outwardly into the heat sink member to optimize the optical performance of the mini bar.

13. In a laser device having a rod member capable of being stimulated to produce a lasing condition therein the improvement comprising novel diode laser pump means positioned such that when stimulated to lase output energy is directed at said laser rod member to produce a lasing condition therein, said pump means including a support member formed of an electrically and thermally conductive material for supporting the laser rod, said support member having at least one surface thereon extending to adjacent one side of the laser rod, a plurality of spaced first and second sets of heat sink members arranged in parallel rows on said surface each constructed of an electrically and thermally conducting material, a plurality of diode lasers mounted on each heat sink of the first set, each of said plurality of diode lasers including a sheet portion constructed of a material having a first semi-conductor characteristic and a plurality of parallel elongated meters constructed of a material having a second semi-conductors characteristic, the elongated members of said plurality extending in closely spaced relation across one surface of the sheet member and each forming a junction therewith, means for attaching the elongated members on the respective sheet portions to respective ones of the heat sinks of the first set in positions oriented such that corresponding ends of the elongated members are closely adjacent to one side of the laser rod, means for applying electric potential between the respective sheet portions and the support member sufficient to produce a lasing condition in the elongated members to generate output energy directed at and stimulating the laser rod.

14. In the laser device of claim 13 means for electrically insulating between each of said heat sinks of said second set and the support member, and means forming electrical connections between the heat sinks of said second set and the respective sheet portions of said laser diodes associated therewith.

15. In the laser device of claim 13 wherein the surface of the support member is defined by spaced surface portions located respectively on opposite sides of the laser rod, each of said surface portions having first and second sets of heat sinks and associated laser diodes arranged in parallel rows on opposite sides of the laser rod.

16. In the laser device of claim 13 wherein the elongated members of the laser diodes are soldered to the heat sinks of the first set.

17. In the laser device of claim 13 wherein the laser rod is a crystal gain medium.

* * * * *

UNITED STATES PATENT OFFICE
CERTIFICATE OF CORRECTION

Patent No. 4,864,584    Dated September 5, 1989

Inventor(s) Danny W. Martin

It is certified that error appears in the above-identified patent and that said Letters Patent is hereby corrected as shown below:

Column 4, line 60 after "34" insert --(Fig.2)--.

Column 8, line 2, "he" should be --the--.

Column 8, line 15, "he" should be --the--.

Column 9, line 18, after "spaced" delete --apart--.

Column 9, line 54, after "directed" insert --at--.

Column 10, line 59, "meters" should be --members--.

Column 10, line 60, "semi-conductors" should be --semi-conductor--.

Signed and Sealed this

Seventeenth Day of July, 1990

Attest:

HARRY F. MANBECK, JR.

Attesting Officer    Commissioner of Patents and Trademarks